United States Patent [19]

Nakatani et al.

[11] 4,348,551
[45] Sep. 7, 1982

[54] SERVICE BARGAIN ANNOUNCEMENT IN AN ELECTRONIC CASH REGISTER

[75] Inventors: Hiroshi Nakatani; Masahide Ishida, both of Yamatokoriyama; Hachizou Yamamoto, Nara, all of Japan

[73] Assignee: Sharp Kabushiki Kaisha, Osaka, Japan

[21] Appl. No.: 130,999

[22] Filed: Mar. 17, 1980

[30] Foreign Application Priority Data

| Mar. 16, 1979 [JP] | Japan | 54-32158 |
| Mar. 16, 1979 [JP] | Japan | 54-32159 |
| Mar. 16, 1979 [JP] | Japan | 54-32160 |
| Mar. 16, 1979 [JP] | Japan | 54-32161 |

[51] Int. Cl.³ ............................................. G10L 1/00
[52] U.S. Cl. ......................... 179/1 SM; 235/92 AC; 364/405
[58] Field of Search ............ 179/1 SM; 364/405, 404, 364/513, 710, 900 MS File; 340/148; 235/92 AC

[56] References Cited

U.S. PATENT DOCUMENTS

| 3,313,923 | 4/1967 | Felcheck | 235/92 AC |
| 3,588,838 | 6/1971 | Felcheck | 364/900 |
| 3,806,711 | 4/1974 | Cousins | 235/92 AC |
| 4,060,848 | 11/1977 | Hyatt | 364/405 X |
| 4,185,169 | 1/1980 | Tanimoto et al. | 179/1 SM |

Primary Examiner—Mark E. Nusbaum
Assistant Examiner—E. S. Kemeny
Attorney, Agent, or Firm—Birch, Stewart, Kolasch & Birch

[57] ABSTRACT

An electronic cash register includes a synthetic speech sound generation system for providing an audible announcement related to a bargain article of the present day and a next service day. The synthetic speech sound generation system is activated when a total key is actuated to complete one set of registration of transaction data assigned to one customer. The synthetic speech sound generation system is alternatively actuated at preselected times. The next service day information is also applied to a printer system for printing out the next service day on a receipt slip. The bargain article to be announced and the date information of the next service day are preset through the use of function keys and numeral keys included in the electronic cash register.

8 Claims, 4 Drawing Figures

SERVICE BARGAIN ANNOUNCEMENT IN AN ELECTRONIC CASH REGISTER

BACKGROUND AND SUMMARY OF THE INVENTION

The present invention relates to an electronic cash register and, more particularly, to an electronic cash register which provides an audible announcement of service bargain information.

Generally, service bargain information is announced through the use of an audio system which is independent of the electronic cash register. However, if the service bargain announcement is conducted by the electronic cash register, the commercial effect can be greatly enhanced.

Accordingly, an object of the present invention is to provide an electronic cash register which provides an audible announcement of service bargain information.

Another object of the present invention is to provide a control system for providing a synthetic speech announcement related to service bargain information in an electronic cash register. Still another object of the present invention is to provide a synthetic speech system wherein the announce information is preselectable through the use of function keys included in an electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a synthetic speech sound generation system is provided in an electronic cash register for providing an audible announcement of the service bargain information. The service bargain of the present day is preset through the use of function keys included in the electronic cash register, and the service bargain is repeatedly audibly announced by the electronic cash register every preselected time interval.

In a preferred form, date information related to the next service day is preset in the electronic cash register. When the transaction assigned to one customer is completed, or when a total key included in a keyboard panel is actuated, the next service day is audibly announced by the synthetic speech sound generation system and also printed out on a receipt slip, which will be handed to the customer, through the use of a printer system included in the electronic cash register.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figures 1, 2, 4:
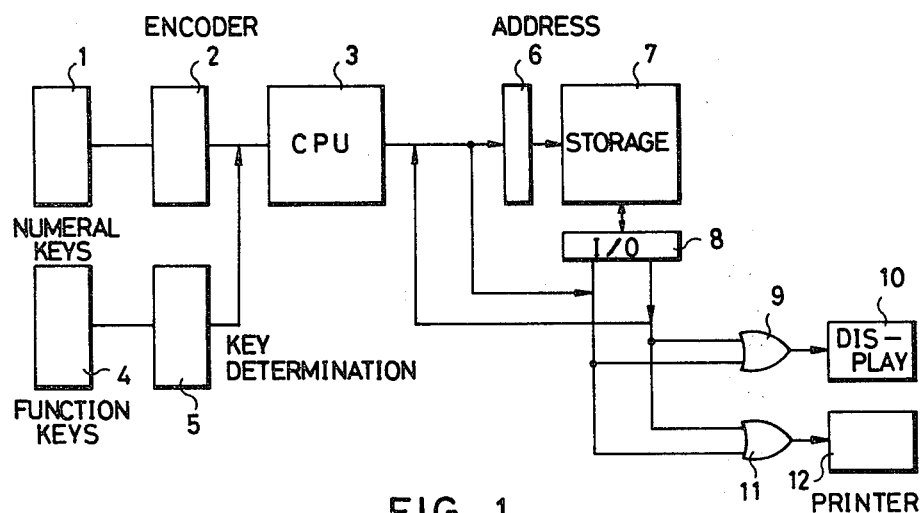
FIG. 1 is a schematic block diagram of a basic construction of the conventional electronic cash register.
FIG. 2 is a plan view of an example of a receipt printout derived from the electronic cash register of FIG. 1.
FIG. 4 is a plan view of an example of a receipt printout derived from the electronic cash register of FIG. 3.

FIG. 1 schematically shows a basic construction of the conventional electronic cash register.

Generally, the electronic cash register mainly comprises numeral keys 1 for introducing numeral information into a central processor unit 3 through a key encoder 2, and function keys 4 for identifying the kind of transaction. A key determination circuit 5 is associated with the function keys 4 for developing a control signal to be forwarded to the central processor unit 3 in response to actuation of the function keys 4. The thus introduced information is applied to a storage circuit 7 through an input/output control circuit 8, and stored in a preselected memory section in the storage circuit 7, the memory section being selected through the use of an address counter 6 in response to the control signal derived from the key determination circuit 5.

The electronic cash register further comprises a digital display unit 10 for displaying information applied through an OR gate 9, and a printer unit 12 for printing out information applied through an OR gate 11 onto a journal paper or a receipt slip.

When the registration of the transaction data assigned to one customer is completed, a total key included in the function keys 4 is actuated to indicate the completion of the transaction. In response to the actuation of the total key, the key determination circuit 5 develops a control signal for effecting the total summing operation within the central processor unit 3, and the total sum is applied to the digital display unit 10 through the OR gate 9 and the printer unit 12 through the OR gate 11. Moreover, the transaction amount information stored in the respective memory sections of the storage circuit 7 is transferred to the corresponding accumulating sections in the storage circuit 7 for accumulating the transaction data related to each kind of the transaction.

FIG. 2 shows an example of a printout format on a receipt slip formed by the conventional electronic cash register of FIG. 1.

Figure 3:
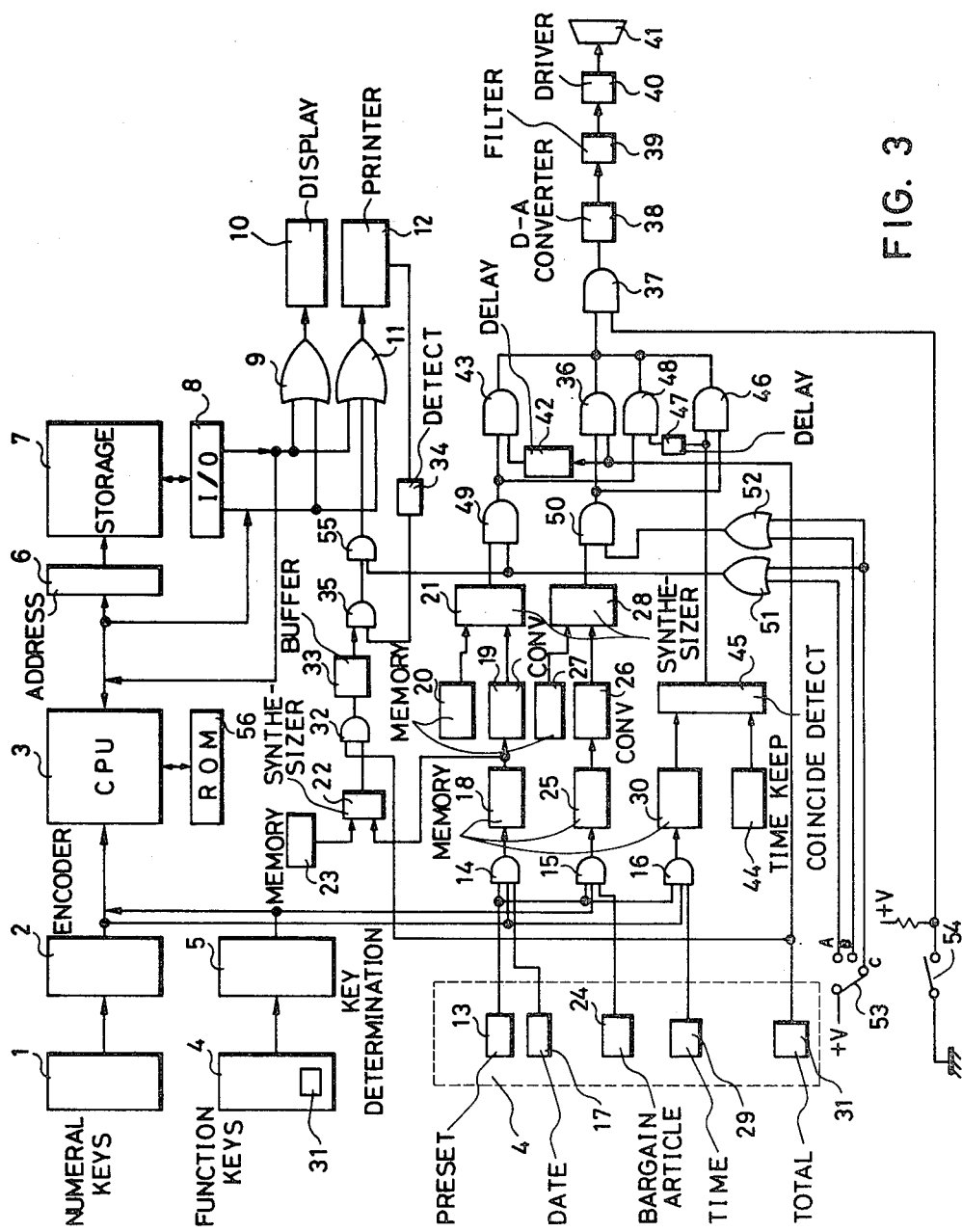
FIG. 3 is a block diagram of an embodiment of an electronic cash register of the present invention.

FIG. 3 shows an embodiment of an electronic cash register of the present invention. Like elements corresponding to those of FIG. 1 are indicated by like numerals.

The electronic cash register of the present invention can provide synthetic speech announcement related to the service bargain articles of the present day and the next coming service day.

The function keys 4 include a preset instruction key 13, a date key 17, a bargain article set key 24, and a time set key 29 for presetting announce information. When the preset instruction key 13 is actuated, AND gates 14, 15 and 16 receive a high level signal at one input terminal thereof.

Thereafter, when the date key 17 is locked, the AND gate 14 is made conductive. Now assume that the next service day is Sept. 10. The numeral keys 1 are actuated to introduce the data information "0910" into a date memory 18 through the AND gate 14. The thus introduced data information is applied to a speech converter 19, which develops synthetic speech data for providing audible announcement of "Sept. 10". A synthetic speech data memory 20 stores synthetic speech data for providing audible announcement of "The next service day is . . . ". The synthetic speech data developed from the speech converter 19 and the synthetic speech data memory 20 are combined with each other by a synthesizer circuit 21, thereby providing the synthetic speech data for announcing the information, "The next service day is Sept. 10". The thus obtained synthetic speech data is stored in the synthesizer circuit 21.

The date information "0910" stored in the date memory 18 is also applied to a converter/synthesizer circuit 22. A memory 23 stores a print format for performing a printing operation related to the next service day. Accordingly, the converter/synthesizer circuit 22 stores the print information for performing the printout of "NEXT SERVICE DAY IS SEP. 10. AWAITING YOUR COMING" as shown in FIG. 4. In this way, the preset operation of the next service day is completed, and the date key 17 is unlocked.

When the bargain article set key 24 is locked, the AND gate 15 is made conductive. Now assume that the bargain article of the present day is vegetables. When the "vegetables" key included in the function keys 4 is actuated, a coded signal indicating the "vegetables" is introduced into an article memory 25 through the AND gate 15. The thus introduced article information is applied to a speech converter 26, which develops synthetic speech data for providing audible announcement of "vegetables". A synthetic speech data memory 27 stores synthetic speech data for providing audible announcement of "The bargain article of the present day is ... ". The synthetic speech data developed from the speech converter 26 and the synthetic speech data memory 27 are combined with each other by a synthesizer circuit 28, thereby providing synthetic speech data for announcing the information, "The bargain article of the present day is vegetables." The thus obtained synthetic speech data is stored in the synthesizer circuit 28. In this way, the preset operation of the bargin article is completed and the bargain article set key 24 is unlocked.

When the time set key 29 is locked, the AND gate 16 is made conductive. Now assume that the above-mentioned next service day announcement and the bargain article announcement are desired to be conducted at ten o'clock, twelve o'clock and fifteen o'clock. The numeral information "10", "12" and "15" is introduced from the numeral keys 1 into a time memory 30 through the AND gate 16. After completion of the time set operation, the time set key 29 is unlocked.

In this way, the preset operation is completed, and the preset instruction key 13 is unlocked to place the electronic cash register into a normal mode of operation. The registration operation of the transaction information is similar to that discussed with reference to FIG. 1.

The electronic cash register of FIG. 3 further comprises a selection switch 53 for selecting the audible announcement. When the selection switch 53 is connected to a first selection terminal A, AND gates 49 and 55 are made conductive through an OR gate 51, whereby only the audible announcement related to the next service day is made effective. When the selection switch 53 is connected to a second selection terminal B, AND gate 50 is made conductive through an OR gate 52, whereby the only audible announcement related to the bargain article is made effective. When the selection switch 53 is connected to a third selection terminal C, the AND gates 49, 50 and 55 are made conductive through the OR gate 51 and 52, whereby the audible announcements related to the next service day and the bargain article are made effective.

Now assume that the selection switch 53 is connected to the third selection terminal C, and a total key 31 is actuated after completion of the registration operation of the transaction information concerning one customer. An AND gate 32 is made conductive to introduce the print information stored in the converter/synthesizer circuit 22 into a buffer memory 33 through the AND gate 32. A detection circuit 34 is provided for developing a detection output to enable an AND gate 35 when the printing the total amount information is completed. Accordingly, the print information temporarily stored in the buffer memory 33 is applied to the printer unit 12 through the AND gates 35, 55 and the OR gates 11. FIG. 4 shows an example of the printout on the receipt slip conducted by the printer unit 12.

When the total key 31 is actuated, an AND gate 36 is also made conductive. Accordingly, the synthetic speech data stored in the synthesizer circuit 28 is applied to one input terminal of an AND gate 37 through the AND gates 50 and 36. The other input terminal of the AND gate 37 is connected to a selection switch 54. If the selection switch 54 is in a closed condition, the synthetic speech data is applied to a digital-to-analog converter 38. An output signal developed from the digital-to-analog converter 38 is applied to a speaker 41 through a low-pass filter 39 and a speaker driver circuit 40 for providing an audible announcement, that is, "The bargain article of the present day is vegetables."

An key actuation signal derived from the total key 31 is also applied to an AND gate 43 via a delay circuit 42. Accordingly, the synthetic speech data stored in the synthesizer circuit 21 is applied to the digital-to-analog converter 38 through the AND gates 49, 43 and 47. Consequently, the synthetic speech announcement of "The next service day is September 10." is developed from the speaker 42 after completion of the announcement of the bargain article. When the next service day announcement is completed, the delay circuit 42 is disabled.

If the selection switch 53 is connected to the first selection terminal A, the AND gate 50 is inhibited. Therefore, only the audible announcement of the next service day is developed, and the next service day information is printed out on the receipt slip. If the selection switch 53 is connected to the second selection terminal B, the AND gates 49 and 55 are inhibited. Therefore, only the audible announcement of the bargain article is developed from the speaker 41.

The electronic cash register of FIG. 3 further includes a time keeping circuit 44. The current time information calculated in the time keeping circuit 44 is applied to a coincidence detection circuit 45. When the time information preset in the time memory 30 becomes identical with the current time information, the coincidence detection circuit 45 develops a detection output to make conductive an AND gate 46. Therefore, the bargain article information stored in the synthesizer circuit 28 is applied to the digital-to-analog converter 38 when the preset time has been reached. Moreover, the detection output of the coincidence detection circuit 45 is applied to an AND gate 48 via a delay circuit 47. Accordingly, the audible announcement related to the next service day is conducted after completion of the audible announcement related to the bargain article of the present day.

When the above-mentioned audible announcement is not desired to be developed, the selection switch 54 is opened. An operation flow of the electronic cash register is programmed in a P-ROM 56 for controlling the operation of the central processor unit 3.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
    numeral keys for introducing money information related to a register transaction and for introducing specific time information;
    function keys for defining the kind of register transaction to be introduced;
    a central processor unit responsive to said numeral and function keys for performing calculations with the introduced money information;
    synthetic speech data storage means including a first memory means for storing synthetic speech data related to the next service bargain day and a second memory means for storing data related to the bargain article;
    mode selection means for selecting said first or second memory means to select the desired synthetic speech data stored in said synthetic speech data storage means;
    audio production means for providing an audible announcement through the use of the synthetic speech data selected by said selection means;
    control means for applying said selected synthetic speech data to said audio production means in response to actuation of a specific key included in said function key;
    time information keeping circuit means for calculating current time information;
    time memory means for storing said specific time information;
    a coincidence detection circuit for developing a coincidence detection output when the current time information becomes identical with said specific time information stored in said time memory means; and
    automatic announcement conducting means for applying said selected synthetic speech data to said audio production means in response to said coincidence detection output.

2. The electronic cash register of claim 1, wherein said specific key is a total key for instructing to said central processor unit for accumulating the money information related to one customer.

3. The electronic cash register of claim 2, further comprising:
    printer means for printing out the money information introduced through said numeral keys and the result of calculations performed by said central processor unit;
    detection means for developing a detection output when the printing operation of said accumulated money information is completed; and
    transfer means for applying the next service bargain day information to said printer means in response to said detection output derived from said detection means.

4. The electronic cash register of claim 1, wherein said synthetic speech data storage means comprises:
    first memory means for storing synthetic speech data for providing a synthetic speech announcement of a bargain article of the present day;
    first generator means for developing synthetic speech data corresponding to a specific article;
    first synthesizer means for combining said synthetic speech data derived from said first memory means and said first generator means;
    second memory means for storing synthetic speech data for providing a synthetic speech announcement of a next service day;
    second generator means for developing synthetic speech data of specific date information; and
    second synthesizer means for combining said synthetic speech data derived from said second memory means and said second generator means.

5. The electronic cash register of claim 4, further comprising:
    priority determination means for first selecting said first synthesizer to thereby produce the synthetic speech announcement of the bargain article of the present day and for subsequently selecting said second synthesizer to thereby produce the synthetic speech announcement of the next service day to be conducted.

6. The electronic cash register of claim 4, further comprising:
    inhibition means for selectively inhibiting application of output signals of said first and second synthesizer means to said audio production means.

7. The electronic cash register of claim 4, 5 or 6, further comprising:
    first preset means for introducing desired article information into said first generator means through the use of said function keys; and
    second preset means for introducing desired date information into said second generator means through the use of said numeral keys.

8. The electronic cash register of claim 1, further comprising:
    preset means for introducing desired preset time information into said time memory means.

* * * * *